United States Patent
Chan et al.

(10) Patent No.: US 9,179,245 B1
(45) Date of Patent: Nov. 3, 2015

(54) PROXIMITY-BASED AUDIO SHARING SYSTEM

(71) Applicant: Acoustic Arc International Ltd., Hong Kong (HK)

(72) Inventors: Kak Man Chan, Hong Kong (HK); Boa Fung Chau, Hong Kong (HK)

(73) Assignee: ACOUSTIC ARC INTERNATIONAL LTD., Hong Kong (HK)

( * ) Notice: Subject to any disclaimer, the term of this patent is extended or adjusted under 35 U.S.C. 154(b) by 19 days.

(21) Appl. No.: 14/273,700

(22) Filed: May 9, 2014

(51) Int. Cl.
*H04B 7/00* (2006.01)
*H04W 4/00* (2009.01)
*H04B 1/00* (2006.01)
*H04W 4/02* (2009.01)

(52) U.S. Cl.
CPC .............. *H04W 4/008* (2013.01); *H04W 4/023* (2013.01)

(58) Field of Classification Search
CPC ..... H04W 84/18; H04W 84/20; H04W 8/005; H04M 1/7253
USPC ............................................... 455/41.1–41.3
See application file for complete search history.

(56) References Cited

U.S. PATENT DOCUMENTS

| 9,071,330 | B2 * | 6/2015 | Frantz | |
| 2008/0259043 | A1 * | 10/2008 | Buil et al. | 345/173 |
| 2014/0179227 | A1 * | 6/2014 | Nousiainen | 455/41.2 |

* cited by examiner

*Primary Examiner* — Lee Nguyen (57) ABSTRACT

A proximity-based audio sharing system includes two identical units in wireless communication with each other. Each unit includes: a wireless transceiver module configured for communicating audio signals with the wireless transceiver module of the other unit; an audio output device connected with the wireless transceiver module and configured for playing back audio signals transmitted from the wireless transceiver module; a mute control circuit connected with the wireless transceiver module and the audio output device, and configured for selectively muting the audio output of the audio output device; and a microcontroller unit connected with the wireless transceiver module and configured for controlling the wireless transceiver module and the mute control circuit, and transmitting a control signal which includes a link signal and a mute control signal to the microcontroller unit of the other unit when the two units are in touch or in proximity of each other.

19 Claims, 5 Drawing Sheets

PROXIMITY-BASED AUDIO SHARING SYSTEM

FIELD OF THE PATENT APPLICATION

The present patent application generally relates to electronics technologies and more specifically to a proximity-based audio sharing system that enables music sharing based on the proximity of the users.

BACKGROUND

Wireless headsets have been made based on various wireless technologies such as Bluetooth, Wifi, Zegbee, NFC, and etc. Normally, a wireless headset includes a transmitting unit and a receiving unit. The transmitting unit is connected with an audio source. Audio signals are modulated and transmitted to the air by the transmitting unit, and picked up, demodulated and played back by the receiving unit. In some cases, there are more than one receiving unit receiving the broadcast from a single transmitting unit, and thereby the same audio content is shared among the multiple receiving units.

However, when two users within the proximity of each other would like to share the music one is listening with the other person respectively, it is desired to have a system that enables the music sharing with minimum loss of audio quality.

SUMMARY

The present patent application is directed to a proximity-based audio sharing system. In one aspect, the system includes two identical units in wireless communication with each other. Each unit includes: a wireless transceiver module, the wireless transceiver module including a first antenna configured for communicating audio signals with the first antenna of the other unit; an audio output device connected with the wireless transceiver module and configured for playing back audio signals transmitted from the wireless transceiver module; a mute control circuit connected with the wireless transceiver module and the audio output device, and configured for selectively muting the audio output of the audio output device; a microcontroller unit connected with the wireless transceiver module and configured for controlling the wireless transceiver module, a link control signal and the mute control circuit; and a second antenna connected with a modulator and configured for transmitting a control signal to the second antenna of the other unit. The second antenna is connected with a demodulator and configured for receiving a control signal from the second antenna of the other unit. The two units are in touch with each other, in touch with each other through human body, or in proximity of each other. The control signal is originated by the microcontroller unit and configured to control a link function and the mute control circuit of the other unit to link to the wireless transceiver module of other unit and selectively mute the audio output device of the other unit respectively.

The audio output device may include a power amplifier with a mute control circuit to connect with the wireless transceiver module, a line in circuit, and at least a speaker. Each unit may further include a modulator and a demodulator. The microcontroller may be connected to the second antenna through the modulator and the demodulator respectively. The modulator may be configured to modulate a link signal generated by the microcontroller into the control signal and the demodulator may be configured to demodulate the modulated control signal to link function. The modulated control signal may be in the frequency range of 1 MHz to 2450 MHz. The modulated control signal may be transmitted through a human body, in touch of each unit or in proximity between 2 audio output devices.

The audio output device may include a power amplifier with a mute control circuit to connect with the wireless transceiver module, a line in circuit, and at least a speaker. Each unit may further include a modulator and a demodulator. The microcontroller may be connected to the second antenna through the modulator and the demodulator respectively.

The modulator may be configured to module a link signal and a mute control signal together generated by the microcontroller into the control signal, and the demodulator may be configured to demodulate the modulated control signal back to a mute control signal. The modulated control signal may be in the frequency range of 1 MHz to 2450 MHz. The modulated control signal may be transmitted through a human body, in touch of each unit or in proximity between 2 audio output devices.

The wireless transceiver module may connect a mode control switch, and the direction of transmission of the audio signals and the control signal between the two units may be based on the mode of the wireless transceiver module. The audio signals may be modulated before being communicated between the first antennas of the two units.

Each unit may further include at least an indicating light, a On/Off/pairing switch, volume adjusting/Play knobs, a charging port, a microphone, and a battery, all of which are connected to the wireless transceiver module.

In another aspect, the proximity-based audio sharing system includes two identical units in wireless communication with each other. Each unit includes: a wireless transceiver module configured for communicating audio signals with the wireless transceiver module of the other unit; an audio output device connected with the wireless transceiver module and configured for playing back audio signals transmitted from the wireless transceiver module; a mute control circuit connected with the wireless transceiver module and the audio output device, and configured for selectively muting the audio output of the audio output device; and a microcontroller unit connected with the wireless transceiver module and configured for controlling the wireless transceiver module, a link signal and the mute control circuit, and transmitting a control signal to the microcontroller unit of the other unit when the two units are in touch or in proximity of each other. The control signal is configured to control the link signal, or the link signal together with the mute control circuit of the other unit to selectively mute the audio output device of the other unit.

The wireless transceiver module may include a first antenna configured for communicating audio signals with the first antenna of the other unit, and the unit may further include a second antenna connected with the microcontroller unit and configured for transmitting a control signal to the second antenna of the other unit. The audio output device may include a power amplifier connected with the wireless transceiver module and the mute control circuit, a line in circuit, and at least a speaker.

Each unit may further include a modulator and a demodulator. The microcontroller may be connected to the second antenna through the modulator and the demodulator respectively. The modulator may be configured to modulate a link signal, or a link signal together with a mute control signal generated by the microcontroller into the control signal, and the demodulator may be configured to demodulate the modulated control signal back to a mute control signal. The modulated control signal may be in the frequency range of 1 MHz to 2450 MHz. The modulated control signal may be transmitted through a human body.

The wireless transceiver module may include a mode control switch, and the direction of transmission of the audio signals and the control signal between the two units may be based on the mode of the switch. Each unit may further include at least an indicating light, a pairing switch, volume adjusting knobs, a charging port, a microphone, and a battery, all of which are connected to the wireless transceiver module.

In yet another aspect, the present patent application provides a method for proximity-based audio sharing between two identical units. The method includes: communicating audio signals between a first wireless transceiver module of a first unit and a second wireless transceiver module of a second unit; playing back audio signals transmitted from the first wireless transceiver module to the second wireless transceiver module with an audio output device connected with the second wireless transceiver module; selectively muting the audio output of the audio output device with a mute control circuit connected with the second wireless transceiver module and the audio output device; and transmitting a control signal from a first microcontroller of the first unit to a second microcontroller of the second unit when the two units are in touch or in proximity of each other. The control signal is configured to control the mute control circuit to selectively mute the audio output device of the second unit.

The method may further include modulating a mute control signal generated by the first microcontroller into the control signal, and demodulating the modulated control signal back to a mute control signal. The modulated control signal may be transmitted through a human body. The method may further include changing the direction of transmission of the audio signals and the control signal between the two units based on the mode of a switch.

DETAILED DESCRIPTION

Reference will now be made in detail to a preferred embodiment of the proximity-based audio sharing system disclosed in the present patent application, examples of which are also provided in the following description. Exemplary embodiments of the system disclosed in the present patent application are described in detail, although it will be apparent to those skilled in the relevant art that some features that are not particularly important to an understanding of the system may not be shown for the sake of clarity.

Furthermore, it should be understood that the system disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
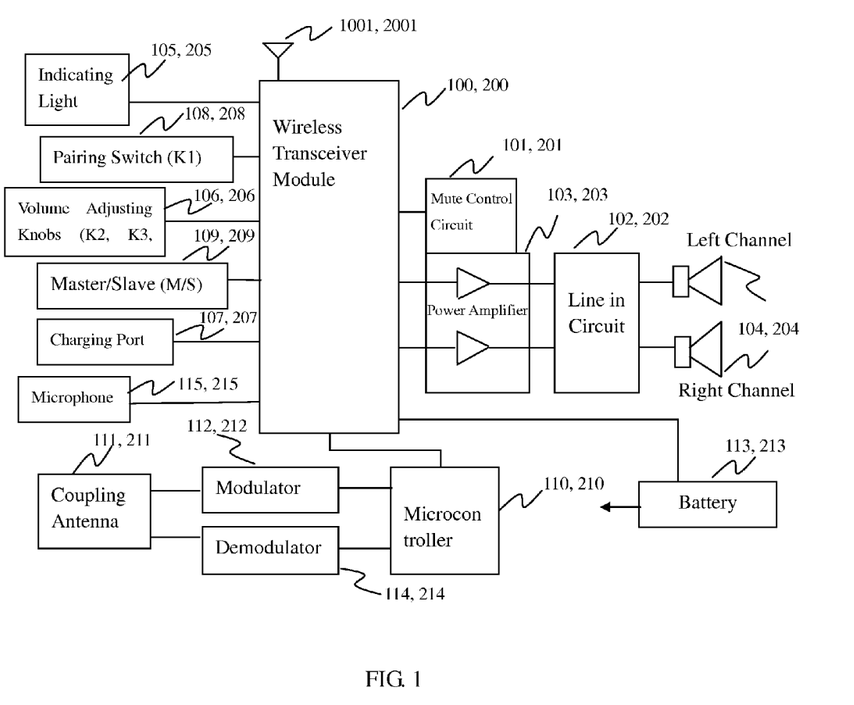
FIG. 1 is a block diagram of one unit of a proximity-based audio sharing system in accordance with an embodiment of the present patent application.

According to an embodiment of the present patent application, a proximity-based audio sharing system includes two identical units in wireless communication with each other. FIG. 1 is a block diagram of one of the two units. Descriptions hereafter will be made to one unit, which may also be referred to as "the unit" or "the first unit", while the remaining unit is referred to as "the other unit" or "the second unit". As the two units are essentially identical, it is understood that a component in one unit corresponds to a component in the other unit. Referring to FIG. 1, the unit includes a wireless transceiver module 100 (corresponding to 200 in the other unit), the wireless transceiver module 100 including a first antenna 1001 (corresponding to 2001 in the other unit) configured for communicating audio signals with the first antenna 2001 of the other unit; an audio output device (described in more detail hereafter) connected with the wireless transceiver module 100 and configured for playing back audio signals transmitted from the wireless transceiver module 100; a mute control circuit 101 (corresponding to 201 in the other unit) connected with the wireless transceiver module 100 and the audio output device, and configured for selectively muting the audio output of the audio output device; a microcontroller unit (MCU) 110 (corresponding to 210 in the other unit) connected with the wireless transceiver module 100 and configured for controlling the wireless transceiver module 100 and the mute control circuit 101, and linking the other unit; and a second antenna 111 (corresponding to 211 in the other unit) connected with the microcontroller unit 110 and configured for transmitting a control signal to the second antenna 211 of the other unit. The two units are in touch with each order, in touch with each other through human body, or in proximity of each other. The control signal is originated by the microcontroller unit 110, and configured to control the mute control circuit 201 of the other unit to selectively mute the audio output device of the other unit.

The audio output device includes a power amplifier 103 (corresponding to 203 in the other unit) with a mute control circuit 101 (corresponding to 201 in the other unit) being connected with the wireless transceiver module 100 (corresponding to 200 in the other unit), a line in circuit 102 (corresponding to 202 in the other unit), and at least a speaker 104 (corresponding to 204 in the other unit). In this embodiment, the audio output device includes a left channel speaker and a right channel speaker.

In this embodiment, the unit further includes a modulator 112 (corresponding to 212 in the other unit) and a demodulator 114 (corresponding to 214 in the other unit). The microcontroller 110 (corresponding to 210 in the other unit) is connected to the second antenna 111 (corresponding to 211 in the other unit) through the modulator 112 (corresponding to 212 in the other unit) and the demodulator 114 (corresponding to 214 in the other unit) respectively. The second antenna 111 is a coupling antenna.

Figure 2A:
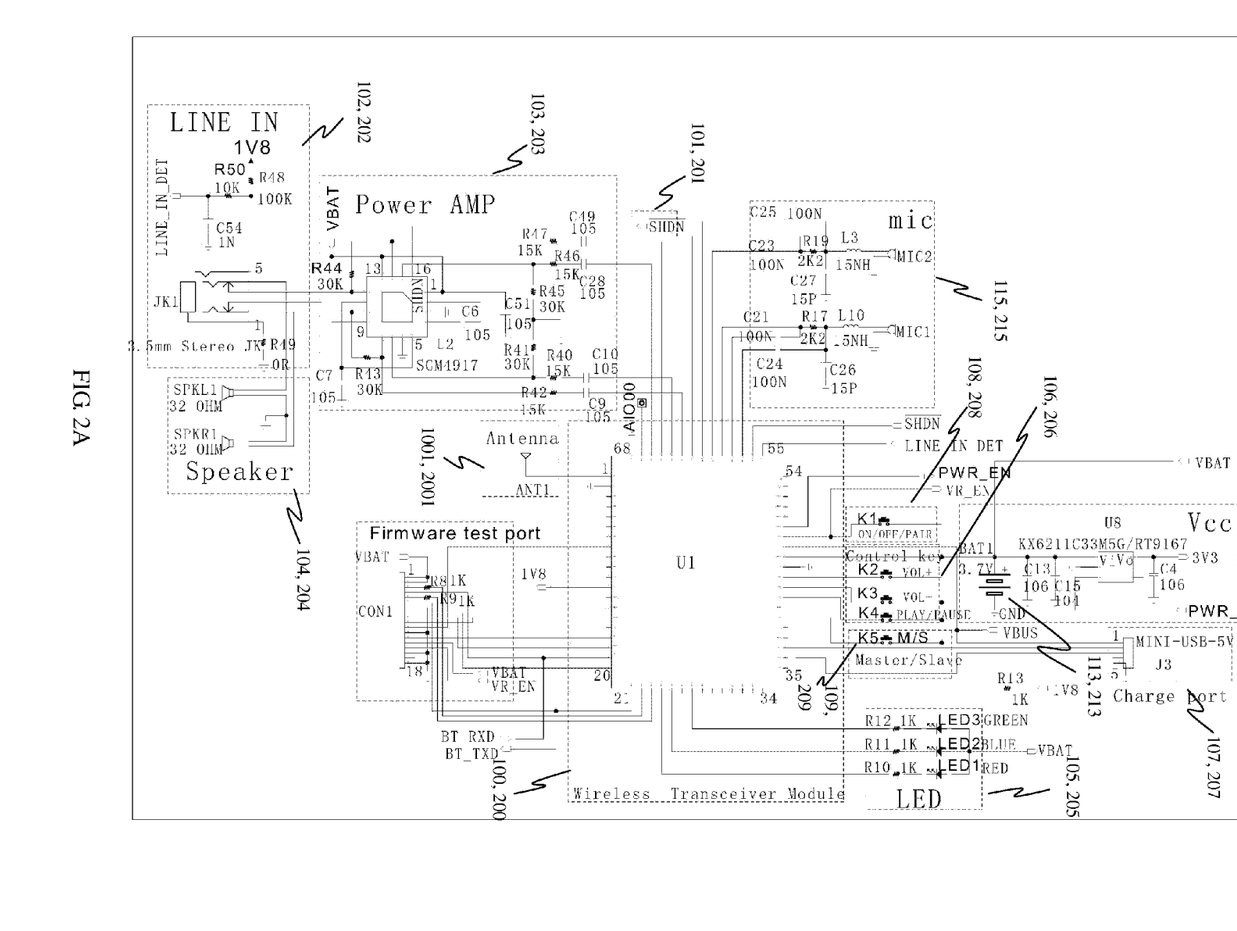
FIG. 2A is a partial schematic circuit diagram of the unit.
Figure 2B:
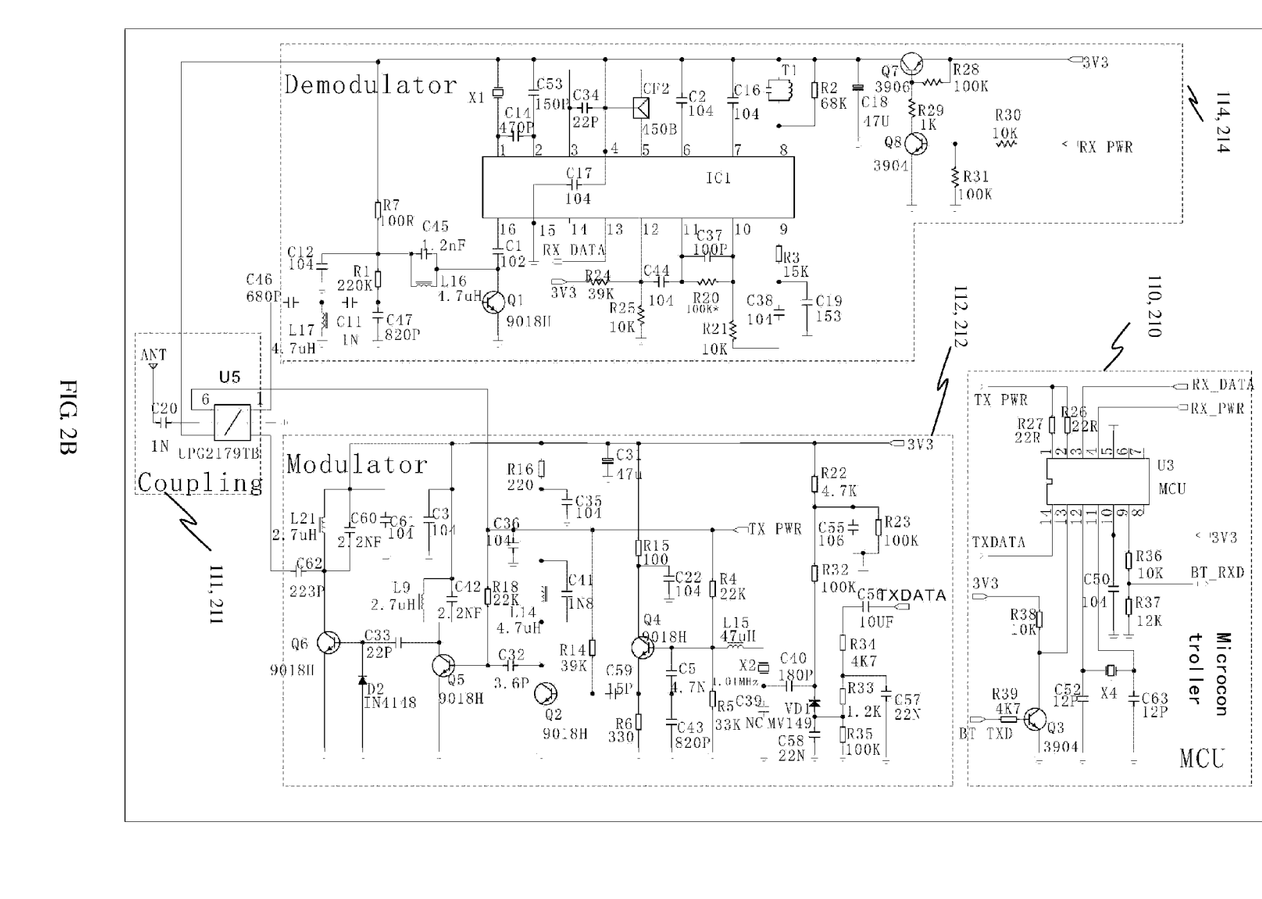
FIG. 2B is another partial schematic circuit diagram of the unit.

FIG. 2A and FIG. 2B are partial schematic circuit diagrams of the unit. Referring to FIG. 2A and FIG. 2B, the wireless transceiver module 100 of the unit is connected with a mode control switch 109. Correspondingly, the wireless transceiver module 200 of the other unit includes a mode control switch 209. By default, the mode control switch 109 is set to "M" (Master mode), and the mode control switch 209 is set to "S" (Slave mode). With such particular settings, the wireless transceiver module 100 of the unit is configured to transmit modulated audio signals to the wireless transceiver module 200 of the other unit through the antennas 1001 and 2001. The wireless transceiver module 200 is configured to demodulate the modulated audio signals so as to restore the audio signals. As by default in this mode, the mute control circuit 101 in the first unit is configured to not to mute the audio output device of the first unit (i.e. the by-pass mode), while the mute control circuit 201 in the second unit is configured to mute the audio output device of the second unit (i.e. the open circuit mode), the restored audio signals are not played back by the audio output device of the second unit until the mute control circuit 201 of the second unit is controlled to stop muting the audio output device by a control signal originated by the microcontroller unit 110 of the first unit. The control process is described in more detail hereafter.

Referring to FIG. 2B, the microcontroller 110 is configured to generate a link signal, or a link signal together with a mute control signal, and then transmit the mute control signal and the link signal to the TXDATA port of the modulator 112. The modulator 112 is configured to modulate the link signal, or the link signal together with the mute control signal at a 2.3 MHz carrier signal. The carrier frequency 2.3 MHz signal is first amplified and then transmitted by the coupling antenna 111 of this unit to the coupling antenna 211 of the other unit.

More specifically, in this embodiment, the carrier frequency 2.3 MHz signal is first transmitted to a human body, which may be the body of the unit's user (referred to as the user A hereafter). The signal is relatively weak, transmitting along the surface of the user's body and radiating in the proximity of the user. When the user A is in touch with the user of the other unit (referred to as the user B), or when user B is in the proximity of the user A, the signal is coupled into the coupling antenna 211 of the other unit. It is understood the signal being transmitted may be of other frequencies in other embodiments. Typically, the frequency of the signal is in the range of 1 MHz to 2450 MHz.

At the end of the other unit, after receiving the modulated signal, the coupling antenna 211 is configured to transmit the signal to the demodulator 214. The demodulator 214 is configured to demodulate the signal into a demodulated signal at the RX_DATA port and transmit the demodulated signal to the microcontroller 210.

The microcontroller 210 is configured to verify whether the demodulated signal is correct. If the demodulated signal is determined to be correct, the microcontroller 210 is configured to transmit a link signal, or a link signal together with a control signal through the BT_RXD port to the wireless transceiver module 200. The wireless transceiver module 200 then links the unit and outputs a voltage to turn on the pin $\overline{\text{SHDN}}$ in the mute control circuit 201 so as to stop muting the audio output device. As a result, the demodulated audio signals, originally transmitted from the first unit, are played back by the speakers 204 of the second unit.

In this embodiment, referring to FIG. 2A, the mute control circuit 201 is integrated with the power amplifier 203. It is understood that in other embodiments, the mute control circuit 201 may be discrete with respect to the power amplifier 203.

When the switch 109 of the first unit is set to "S", and the switch 209 of the second unit is set to "M", the above-mentioned situation is reversed. The second unit will be transmitting the modulated audio signals and the modulated control signal to the first unit. The audio signals will be played back by the first unit, if the two units are in touch or in proximity of each other so that the signals can be transmitted. It is understood the switches 109 and 209 may be set to other modes, such as identical "M" or identical "S". In those situations, the units may be set to operate independently like two stand-alone audio players, or set to execute some other predetermined programs.

In this embodiment, referring to FIGS. 1, 2A, and 2B, the unit further includes at least an indicating light 105 (corresponding to 205 in the other unit), a pairing switch and on/off switch (K1) 108 (corresponding to 208 in the other unit), volume adjusting knobs and play knob (K2, K3, K4) 106 (corresponding to 206 in the other unit), a charging port 107 (corresponding to 207 in the other unit), a microphone 115 (corresponding to 215 in the other unit), and a battery 113 (corresponding to 213 in the other unit), all of which are connected to the wireless transceiver module 100.

Figure 3:
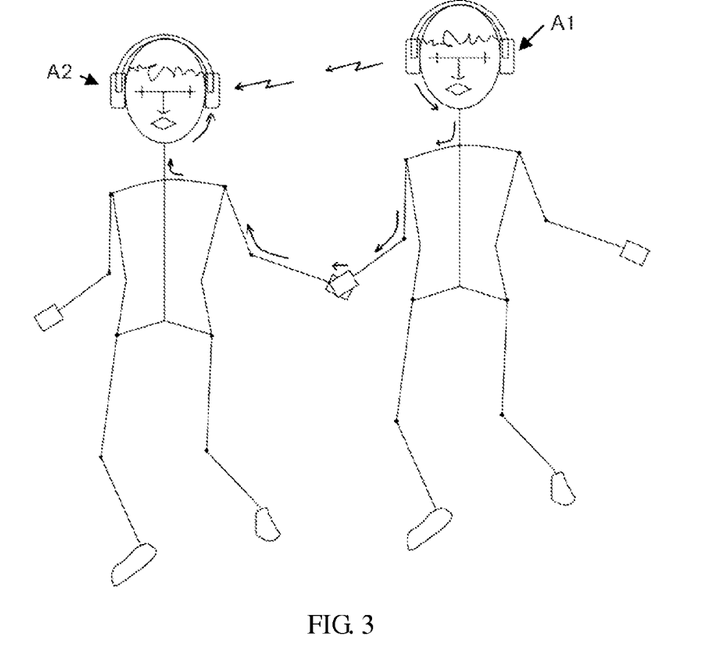
FIG. 3 illustrates two users being hand in hand using the proximity-based audio sharing system according to an embodiment of the present patent application.

FIG. 3 illustrates two users being hand in hand using the proximity-based audio sharing system according to an embodiment of the present patent application. As shown in FIG. 3, the system includes a unit A1 and a unit A2, which is identical to A1. In this embodiment, the units A1 and A2 are in the form of headsets. The modulated control signal is transmitted from the unit A1 to the unit A2 through the users' hands. The radio frequency modulated audio signals are directly transmitted from the unit A1 to the unit A2 through air.

Figure 4:
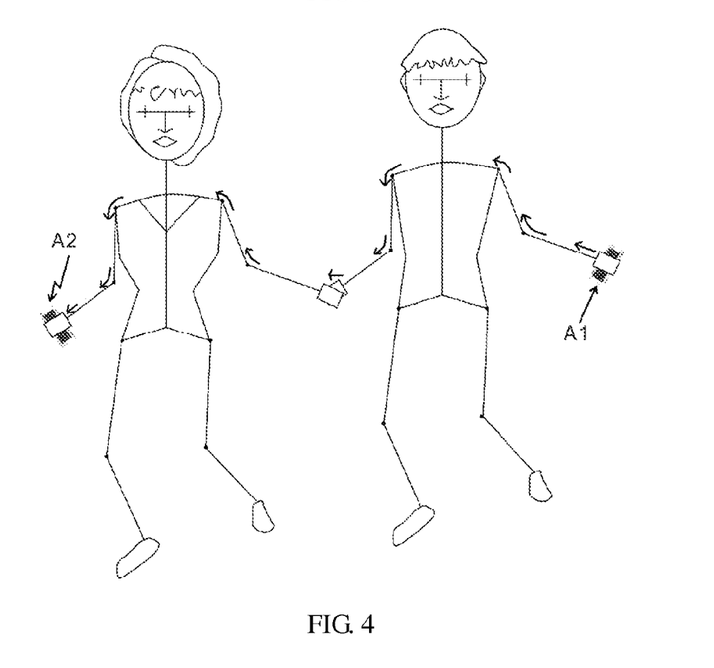
FIG. 4 illustrates two users being hand in hand using the proximity-based audio sharing system according to another embodiment of the present patent application.

FIG. 4 illustrates two users being hand in hand using the proximity-based audio sharing system according to another embodiment of the present patent application. As shown in FIG. 4, the system includes a unit A1 and a unit A2, which is identical to A1. In this embodiment, the units A1 and A2 are in the form of music speakers. Again, the modulated control signal as aforementioned is transmitted from the unit A1 to the unit A2 through the users' hands.

Figure 5:
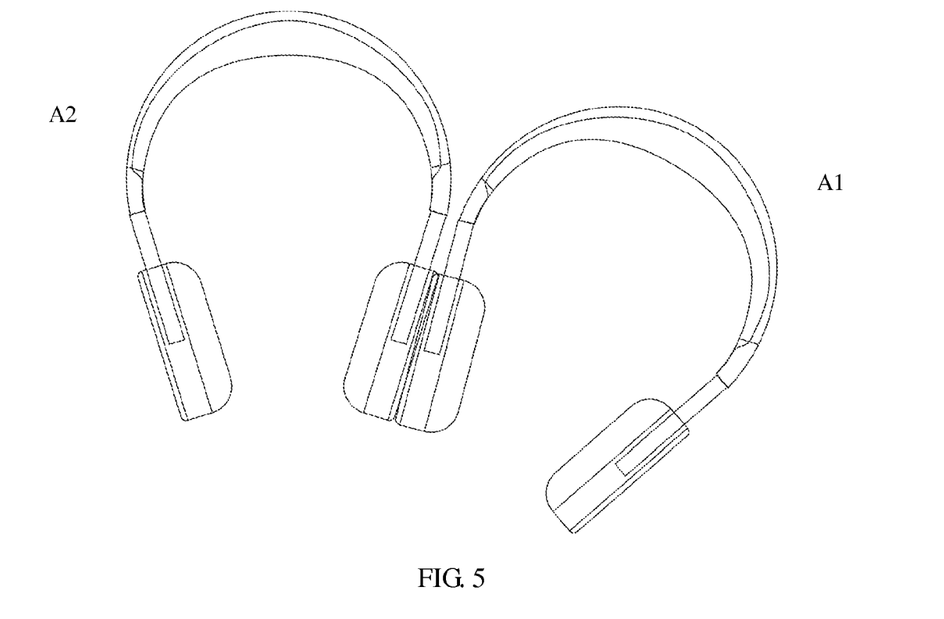
FIG. 5 illustrates a proximity-based audio sharing system in the form of two headsets according to another embodiment of the present patent application.

FIG. 5 illustrates a proximity-based audio sharing system in the form of two headsets according to another embodiment of the present patent application. Referring to FIG. 5, the system includes a unit A1 and a unit A2, which is identical to A1. In this embodiment, the units A1 and A2 are in the form of headsets. When the units A1 and A2 are in touch or in proximity of each other, the modulated control signal as aforementioned can be transmitted from the unit A1 to the unit A2, or from the unit A2 to the unit A1.

Figure 6:
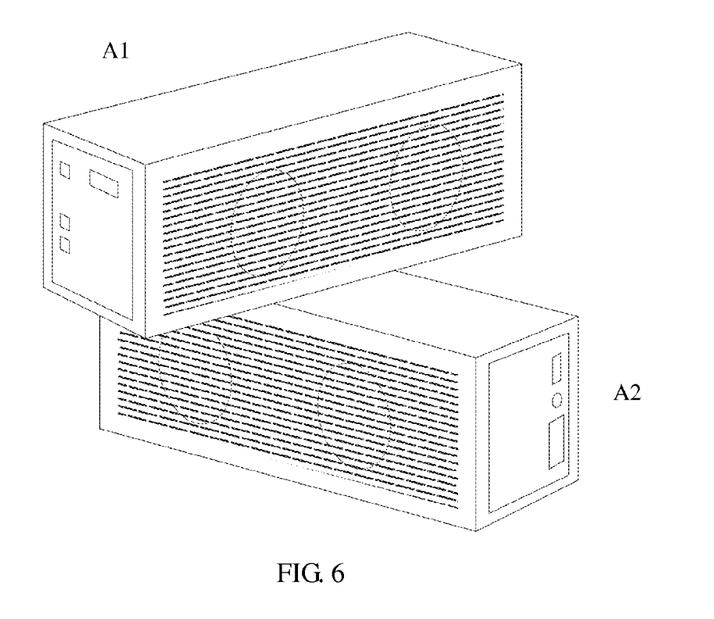
FIG. 6 illustrates a proximity-based audio sharing system in the form of two music speakers according to another embodiment of the present patent application.

FIG. 6 illustrates a proximity-based audio sharing system in the form of two music speakers according to another embodiment of the present patent application. Referring to FIG. 6, the system includes a unit A1 and a unit A2, which is identical to A1. In this embodiment, the units A1 and A2 are in the form of music speakers. When the units A1 and A2 are in touch or in proximity of each other, the modulated control signal as aforementioned can be transmitted from the unit A1 to the unit A2, or from the unit A2 to the unit A1.

According to another embodiment of the present patent application, a proximity-based audio sharing system includes two identical units in wireless communication with each other. Each unit includes: a wireless transceiver module configured for communicating audio signals with the wireless transceiver module of the other unit; an audio output device connected with the wireless transceiver module and configured for playing back audio signals transmitted from the wireless transceiver module; a link signal, or a link signal together with a mute control circuit connected with the wireless transceiver module and the audio output device, and configured for linking, or linking together with selectively muting the audio output of the audio output device; and a microcontroller unit connected with the wireless transceiver module and configured for controlling the wireless transceiver module and the mute control circuit, and transmitting a control signal to the microcontroller unit of the other unit when the two units are in touch or in proximity of each other. The control signal is configured to control the link signal, or the link signal together with the mute control circuit of the other unit to selectively mute the audio output device of the other unit.

According to yet another embodiment of the present patent application, a method for proximity-based audio sharing between two identical units is provided. The method includes: communicating audio signals between a first wireless transceiver module of a first unit and a second wireless transceiver module of a second unit; playing back audio signals transmitted from the first wireless transceiver module to the second wireless transceiver module with an audio output device connected with the second wireless transceiver module; linking the 2 audio devices, selectively muting the audio output of the audio output device with a mute control circuit connected with the second wireless transceiver module and the audio output device; and transmitting a control signal from a first microcontroller of the first unit to a second microcontroller of the second unit when the two units are in touch or in proximity of each other. The control signal is configured to control the mute control circuit to selectively mute the audio output device of the second unit.

According to still another embodiment, a proximity-based audio sharing system includes two identical units in wireless communication with each other. Each unit includes: a wireless transceiver module, the wireless transceiver module including a first antenna configured for communicating audio signals with the first antenna of the other unit; an audio output device connected with the wireless transceiver module and configured for playing back audio signals transmitted from the wireless transceiver module; a mute control circuit connected with the wireless transceiver module and the audio output device, and configured for selectively muting the audio output of the audio output device; a microcontroller unit connected with the wireless transceiver module and configured for controlling the wireless transceiver module and the mute control circuit; and a second antenna connected with the microcontroller unit and configured for transmitting a control signal to the second antenna of the other unit. The two units are in touch or in proximity of each other. The control signal is originated by the microcontroller unit and configured to generate a link signal for linking up with the other unit.

According to still another embodiment, a proximity-based audio sharing system includes two identical units in wireless communication with each other. Each unit includes: a wireless transceiver module configured for communicating audio signals with the wireless transceiver module of the other unit; an audio output device connected with the wireless transceiver module and configured for playing back audio signals transmitted from the wireless transceiver module; a mute control circuit connected with the wireless transceiver module and the audio output device, and configured for selectively muting the audio output of the audio output device; and a microcontroller unit connected with the wireless transceiver module and configured for controlling the wireless transceiver module and the mute control circuit, and transmitting a control signal to the microcontroller unit of the other unit when the two units are in touch or in proximity of each other. The control signal is configured to control the mute control circuit of the other unit to selectively mute the audio output device of the other unit and control a link function of the other unit.

In the above embodiments, the control signal is transmitted from one unit to the other unit only when the two units are in touch or in proximity of each other. Typically, the transmission of the control signal is substantially made through the human body of the users. On the other hand, the audio signal is transmitted wirelessly through the air directly. The transmission of the audio signals is not proximity based, and typically not made through the human body. Therefore, music sharing with close interactions between the users is achieved without bringing the noise associated with proximity transmission into the audio signals and thereby sacrificing the audio quality.

Throughout the present patent application, the "proximity-based audio sharing system" means the realization of audio sharing of this system is to some extent based on or dependent on whether the two units are nearby to each other (i.e. in proximity of each other). "The two units are in touch or in proximity of each other" includes the scenarios of a) the two units are in touch; and b) the two units are nearby to each other.

While the present patent application has been shown and described with particular references to a number of embodiments thereof, it should be noted that various other changes or modifications may be made without departing from the scope of the present invention.

What is claimed is:

1. A proximity-based audio sharing system comprising two identical units in wireless communication with each other, each unit comprising:
   a wireless transceiver module, the wireless transceiver module comprising a first antenna configured for communicating audio signals with the first antenna of the other unit;
   an audio output device connected with the wireless transceiver module and configured for playing back audio signals transmitted from the wireless transceiver module;
   a mute control circuit connected with the wireless transceiver module and the audio output device, and configured for selectively muting the audio output of the audio output device;
   a microcontroller unit connected with the wireless transceiver module and configured for controlling the wireless transceiver module and the mute control circuit; and
   a second antenna connected with the microcontroller unit and configured for transmitting a control signal to the second antenna of the other unit; wherein:
   the two units are in touch or in proximity of each other; and
   the control signal is originated by the microcontroller unit and configured to generate a link signal for linking up with the other unit;
   wherein each unit further comprises a modulator and a demodulator, the microcontroller is connected to the second antenna through the modulator and the demodulator respectively, the modulator is configured to modulate a mute control signal generated by the microcontroller into the control signal, and the demodulator is configured to demodulate the modulated control signal back to a mute control signal.

2. The proximity-based audio sharing system of claim 1, wherein the audio output device comprises a power amplifier connected with the wireless transceiver module and the mute control circuit, a line in circuit, and at least a speaker.

3. The proximity-based audio sharing system of claim 1, wherein the modulated control signal is a radio frequency signal in the frequency range of 1 MHz to 2450 MHz.

4. The proximity-based audio sharing system of claim 3, wherein the modulated control signal is transmitted through a human body.

5. The proximity-based audio sharing system of claim 1, wherein the wireless transceiver module comprises a mode control switch, and the direction of transmission of the audio signals and the control signal between the two units are based on the mode of the switch.

6. The proximity-based audio sharing system of claim 1, wherein the audio signals are modulated before being communicated between the first antennas of the two units.

7. The proximity-based audio sharing system of claim 1, wherein each unit further comprises at least an indicating light, a pairing switch, volume adjusting knobs, a charging port, a microphone, and a battery, all of which are connected to the wireless transceiver module.

8. A proximity-based audio sharing system comprising two identical units in wireless communication with each other, each unit comprising:
- a wireless transceiver module configured for communicating audio signals with the wireless transceiver module of the other unit;
- an audio output device connected with the wireless transceiver module and configured for playing back audio signals transmitted from the wireless transceiver module;
- a mute control circuit connected with the wireless transceiver module and the audio output device, and configured for selectively muting the audio output of the audio output device; and
- a microcontroller unit connected with the wireless transceiver module and configured for controlling the wireless transceiver module and the mute control circuit, and transmitting a control signal to the microcontroller unit of the other unit when the two units are in touch or in proximity of each other; wherein:
- the control signal is configured to control the mute control circuit of the other unit to selectively mute the audio output device of the other unit and control a link function of the other unit.

9. The proximity-based audio sharing system of claim 8, wherein the wireless transceiver module comprises a first antenna configured for communicating audio signals with the first antenna of the other unit, and the unit further comprises a second antenna connected with the microcontroller unit and configured for transmitting a control signal to the second antenna of the other unit.

10. The proximity-based audio sharing system of claim 9, wherein each unit further comprises a modulator and a demodulator, the microcontroller is connected to the second antenna through the modulator and the demodulator respectively, the modulator is configured to modulate a mute control signal generated by the microcontroller into the control signal, and the demodulator is configured to demodulate the modulated control signal back to a mute control signal.

11. The proximity-based audio sharing system of claim 10, wherein the modulated control signal is a radio frequency signal in the frequency range of 1 MHz to 2450 MHz.

12. The proximity-based audio sharing system of claim 10, wherein the modulated control signal is a radio frequency signal being transmitted through a human body.

13. The proximity-based audio sharing system of claim 8, wherein the audio output device comprises a power amplifier connected with the wireless transceiver module and the mute control circuit, a line in circuit, and at least a speaker.

14. The proximity-based audio sharing system of claim 8, wherein the wireless transceiver module comprises a mode control switch, and the direction of transmission of the audio signals and the control signal between the two units is based on the mode of the switch.

15. The proximity-based audio sharing system of claim 8, wherein each unit further comprises at least an indicating light, a pairing switch, volume adjusting knobs, a charging port, a microphone, and a battery, all of which are connected to the wireless transceiver module.

16. A method for proximity-based audio sharing between two identical units, the method comprising:
- communicating audio signals between a first wireless transceiver module of a first unit and a second wireless transceiver module of a second unit;
- playing back audio signals transmitted from the first wireless transceiver module to the second wireless transceiver module with an audio output device connected with the second wireless transceiver module;
- selectively muting the audio output of the audio output device with a mute control circuit connected with the second wireless transceiver module and the audio output device; and
- transmitting a control signal from a first microcontroller of the first unit to a second microcontroller of the second unit when the two units are in touch or in proximity of each other; wherein:
- the control signal is configured to control the mute control circuit to selectively mute the audio output device of the second unit.

17. The method of claim 16 further comprising modulating a mute control signal and a link signal generated by the first microcontroller into the control signal, and demodulating the modulated control signal back to a mute control signal and link signal.

18. The method of claim 17, wherein the modulated control signal is transmitted through a human body.

19. The method of claim 16 further comprising changing the direction of transmission of the audio signals and the control signal between the two units based on the mode of a switch.

* * * * *